(12) United States Patent
Beaverson et al.

(10) Patent No.: US 10,936,503 B2
(45) Date of Patent: *Mar. 2, 2021

(54) DEVICE ACCESS POINT MOBILITY IN A SCALE OUT STORAGE SYSTEM

(71) Applicant: ORCA DATA TECHNOLOGY (XI'AN) CO., LTD, Xianyang (CN)

(72) Inventors: Arthur James Beaverson, Boxborough, MA (US); Bang Chang, Cary, NC (US)

(73) Assignee: ORCA DATA TECHNOLOGY (XI'AN) CO., LTD, Xianyang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,635

(22) Filed: May 3, 2019

(65) Prior Publication Data

US 2019/0258586 A1 Aug. 22, 2019

Related U.S. Application Data

(63) Continuation of application No. 15/536,386, filed as application No. PCT/US2016/012102 on Jan. 5, 2016, now Pat. No. 10,402,339, which is a continuation-in-part of application No. PCT/US2015/053226, filed on Sep. 30, 2015.

(60) Provisional application No. 62/099,748, filed on Jan. 5, 2015.

(51) Int. Cl.
*G06F 12/10* (2016.01)
*G06F 3/06* (2006.01)

(52) U.S. Cl.
CPC ............ *G06F 12/10* (2013.01); *G06F 3/0604* (2013.01); *G06F 3/064* (2013.01); *G06F 3/0647* (2013.01); *G06F 3/0685* (2013.01); *G06F 2212/1008* (2013.01); *G06F 2212/657* (2013.01)

(58) Field of Classification Search
CPC ........ G06F 12/10; G06F 3/0604; G06F 3/064; G06F 3/0647; G06F 3/0685; G06F 2212/1008; G06F 2212/657
USPC ........................ 710/38; 711/154, 203; 714/2
See application file for complete search history.

(56) References Cited

U.S. PATENT DOCUMENTS

| 7,321,962 B1 | 1/2008 | Fair et al. |
| 10,402,339 B2 * | 9/2019 | Beaverson ............. G06F 12/10 |
| 2004/0049553 A1 * | 3/2004 | Iwamura ........... H04L 29/12018 709/213 |

(Continued)

FOREIGN PATENT DOCUMENTS

CN 103502926 A 1/2014

*Primary Examiner* — Hong C Kim

(57) ABSTRACT

A method for managing metadata in a scale out storage system is disclosed. The system includes a plurality of nodes, a storage pool, first metadata that maps logical addresses of logical data blocks to corresponding content identifiers, and second metadata that maps content identifiers to corresponding physical addresses of physical data blocks in the storage pool and maintains a reference count. During an add-a-node operation, the processors are configured to move from the existing nodes to the new node some of its physical data blocks, their content identifiers and reference counts in the second metadata without accessing or altering the first metadata. A method is disclosed to move a logical device from one node to another by de-activating the logical device's first metadata on the first node and activating and retrieving the logical device's first metadata on the second node.

14 Claims, 13 Drawing Sheets

(56) References Cited

U.S. PATENT DOCUMENTS

| | | | |
|---|---|---|---|
| 2007/0022087 A1 | 1/2007 | Bahar et al. | |
| 2011/0173504 A1* | 7/2011 | Kabakura | G06F 11/0748 |
| | | | 714/48 |
| 2012/0137085 A1* | 5/2012 | Kaneta | G06F 3/061 |
| | | | 711/154 |
| 2012/0166866 A1 | 6/2012 | Rao et al. | |
| 2012/0323859 A1 | 12/2012 | Yasa et al. | |
| 2014/0115579 A1* | 4/2014 | Kong | G06F 3/0665 |
| | | | 718/1 |
| 2015/0052179 A1 | 2/2015 | Novick | |
| 2017/0075779 A1* | 3/2017 | Grimaldi | G06F 11/1471 |
| 2017/0083417 A1* | 3/2017 | Kawaguchi | G06F 3/0619 |
| 2019/0026039 A1* | 1/2019 | Wang | G06F 3/0614 |
| 2019/0235777 A1* | 8/2019 | Wang | G06F 13/4022 |
| 2020/0125270 A1* | 4/2020 | Rao | G06F 3/0604 |

* cited by examiner

DEVICE ACCESS POINT MOBILITY IN A SCALE OUT STORAGE SYSTEM

RELATED APPLICATIONS

The present application is a continuation application of U.S. application Ser. No. 15/536,386 filed on Jun. 15, 2017 and titled Metadata Management in a Scale Out Storage System, which is the US national phase application of the International Application No. PCT/US16/12102 filed on Jan. 5, 2016, claiming priority to U.S. Provisional Application No. 62/099,748 filed on Jan. 5, 2015 and to International Application No. PCT/US2015/053226 filed on Sep. 30, 2015 and titled Efficient Metadata in a Storage System, all of which are incorporated by reference herein in their entirety.

TECHNICAL FIELD

The present disclosure relates generally to storage systems, and, more specifically, to managing metadata in a scale out storage system.

BACKGROUND

A scale out storage system comprises a plurality of nodes connected by a network. Each node is equipped with a processor, a memory, and a number of storage devices. The storage devices may be hard disk drives (HDDs), solid-state devices (SSDs), or a combination of both (Hybrid). The storage devices may be configured under a RAID (Redundant Array of Inexpensive Disks) hardware or software for data redundancy and load balancing. The storage devices may be local to each node or shared among multiple nodes. The processor may be dedicated to running storage software or shared between storage software and user applications. Storage software, such as a logical volume manager, provides storage virtualization, capacity reduction, scale out, high availability, mobility, and performance.

Storage virtualization decouples the logical devices addressed by user applications from the physical data placement on the storage devices. Storage virtualization allows the processor to optimize physical data placement based on the characteristics of the storage devices and provide capacity reduction such as data deduplication. User applications address a logical device by its Logical Unit Number (LUN). A logical data block associated with a logical device is identified by a logical block number (LBN). Thus, a complete logical address for a logical data block comprises the LUN of the logical device and LBN for the logical block. To support storage virtualization, the processor translates each user I/O request addressed to a LUN and a LBN to a set of I/O requests addressed to storage device IDs and physical block numbers (PBNs). That is, the software translates the logical addresses of the logical data blocks into corresponding physical addresses for the physical data blocks stored in the data storage devices. In some storage software implementations, in order to perform this translation, the processor maintains forward map metadata that maps each data block's LBN to its PBN. To support data deduplication the processor maintains deduplication metadata that maps each data block's fingerprint (a hash of the block's contents) to its PBN. Additional metadata may be maintained in support of other data services such as compression and snapshot.

A data block is the smallest storage unit that the processor manages via its metadata. The size of the data block can be as small as 4 KB or as large as an entire volume. There are advantages in employing small data block sizes in order to optimize data placement and increase deduplication ratio. The size of the forward map metadata is determined by the data block size and the usable capacity of the storage system. On a small capacity storage system with a large data block size, the entire metadata may be small enough to be cached in the memory for fast access and stored persistently on the storage devices. However metadata is becoming increasingly larger driven by larger physical capacity and smaller data block sizes. Data services such as deduplication, compression, and snapshot also increase the metadata size by many folds by increasing the usable capacity of the system. In the case where the memory is not large enough to cache the entire metadata, the metadata is stored persistently on the storage devices, with a portion of it cached in the memory. Caching is only effective when metadata access has locality of reference—real world user applications tend to access related logical device addresses frequently. User application locality of reference allows the processor to cache frequently accessed metadata entries in the memory without significant loss of performance. Without user application locality of reference, caching simply devolves into thrashing, which exhausts system resources and slows down performance.

Scale out is a key requirement for a scale out storage system. One example of scale out is add-a-node where a new node is added to the storage system to provide more storage capacity and performance. Another example of scale out is remove-a-node where an existing node is removed from the storage system. In both cases a large number of data blocks need to be moved from their current physical locations to new locations in order to redistribute data blocks across all available capacity and bandwidth. Scale out is expected to be transparent to user applications—change in a data block's physical location should not affect its LUN/LBN addressed by user applications. In some storage software implementations, the processor maintains reverse map metadata that maps every physical data block's PBN to the LBNs that reference it. As part of moving a data block from PBN1 to PBN2, the processor first looks up PBN1 in the reverse map metadata to identify all the LBNs that reference PBN1. It then looks up these LBNs in the forward map metadata and changes their reference from PBN1 to PBN2. The processor then goes back to the reverse map metadata to change PBN1 to PBN2. If deduplication is enabled, the processor determines the fingerprint of the data block and updates the fingerprint's entry in the deduplication metadata from referencing PBN1 to referencing PBN2. Given that this data movement in support of scale out is not originated by a user application and therefore does not benefit from user application locality of reference, these numerous accesses to reverse map, forward map, and deduplication metadata cannot be effectively cached in the memory, causing the system to thrash.

Logical device availability refers to making a logical device available on node B in the event that its original host node A fails. Logical device mobility refers to moving a logical device from node A to node B for load balancing. Both logical device availability and mobility can be measured by time to access and time to performance. Time to access is defined as the time it takes for the logical device to support the first user I/O on the node B. Time to performance is defined as the time it takes for the logical device to restore its original performance. For storage software implementations that support storage virtualization through forward map metadata, time to access is relatively long as the forward map metadata needs to be moved from Node A to Node B.

Providing high performance is challenging for a scale out storage system as data blocks are distributed across multiple nodes and remote access incurs network latency. Some storage software implementations try to mitigate this network latency issue by placing most of the data blocks referenced by a logical device on the same node as the logical device, known as data locality. Data locality poses a number of issues. First of all, logical devices are often not load balanced themselves across the plurality of nodes, leading to unbalanced data block placement in terms of capacity and performance. Secondly in the event that a logical device is moved, most of its data blocks need to be moved to the new node, resulting in long time to performance.

In view of the above, there is a need for more efficient metadata management in support of storage virtualization, capacity reduction, scale out, high availability, mobility, and performance.

SUMMARY

Methods and apparatus for managing metadata in a scale out storage system are disclosed.

A storage system is configured to support scale out and logical device mobility. The storage system comprises a plurality of nodes connected by a network. Each node comprises a processor, a memory, and one or more storage devices. The storage system is configured to manage a storage pool, first metadata, and second metadata. The storage pool comprises storage devices from the plurality of nodes and a free block list. The first metadata maps the logical address of each logical data block to a corresponding content identifier (CID). The second metadata maps each content identifier to a corresponding physical address within the storage pool and maintains a reference count. Both the metadata and data blocks are stored within the storage pool redundantly across the nodes and accessible by all the nodes. During an add-a-node operation, the processors are configured to move from the existing nodes to the new node some of the data blocks, their content identifiers and reference counts without accessing the first metadata. To move a logical device from node A to node B, the processor on node A de-activates access to the logical device on node A and the processor on node B activates access to the logical device on node B by retrieving its first metadata from the storage pool. To accelerate time to access, the first metadata for the logical device can be organized in a tree data structure. The processor on node B can activate access to the logical device after retrieving the root of its tree. To accelerate time to performance, the processor on node A can push its local cache to node B.

In some embodiments the first metadata is stored within the storage pool and cached in the memory based on locality of reference. In some embodiments the second metadata is stored within the storage pool and cached entirely in the memory. In some embodiments each first metadata entry comprises only the data block's content identifier. LBN is not stored but can be determined based on its metadata entry's relative position in the first metadata. In some embodiments entries in the first metadata are stored in metadata blocks. A content identifier is generated for each metadata block and metadata blocks are deduplicated.

Of course, the present invention is not limited to the features, advantages, and contexts summarized above, and those familiar with storage technologies will recognize additional features and advantages upon reading the following detailed description and upon viewing the accompanying drawings.

DETAILED DESCRIPTION

Methods for managing metadata in a scale out storage system are disclosed to more effectively support storage virtualization, capacity reduction, scale out, availability, mobility, and performance. For purposes of this disclosure, similar elements are identified by similar numeric reference numbers. A numeric reference number followed by a lowercase letter refers to a specific instance of the element.

Figure 1:
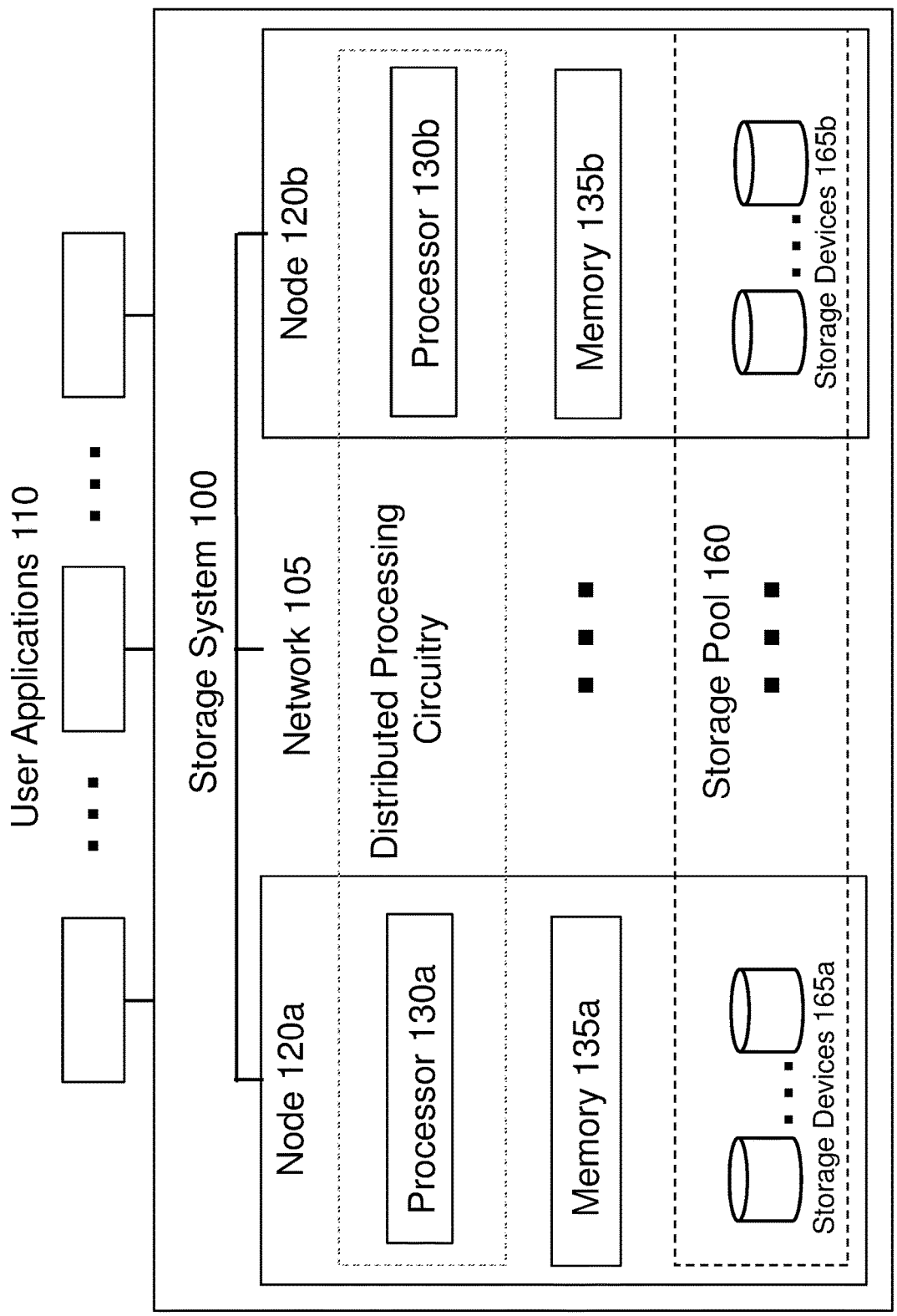
FIG. 1 illustrates a block diagram of a scale out storage system.

FIG. 1 illustrates one embodiment of a scale out storage system 100 comprising a plurality of nodes 120 connected by a network 105. An exemplary node 120 comprises a processor 130, a memory 135, and a plurality of storage devices 165. The processor 130 may comprise a microprocessor, microcontroller, digital signal processor, hardware circuit, firmware, or a combination thereof. The processors 130 at each node 120 collectively comprise a distributed processing circuitry that controls the storage system. Memory 135 may comprise both volatile and non-volatile memory for locally storing information and data used by the data node. The storage devices 165 at different nodes 120 within the storage system 100 collectively form a shared data storage pool 160 accessible to the processors 130 at each node 120. Examples of storage devices 165 include solid-state devices (SSDs), hard disk drives (HDDs), and a combination of SSDs and HDDs (Hybrid). The storage devices 165 may be configured under a RAID system data redundancy and load balancing. Examples of RAID system include software RAID, hardware RAID card, RAID on a chip, Erasure Coding, or JBOD (Just a Bunch of Disks). The storage devices 165 may also include a NVRAM device for write caching and deferred writes. Examples of NVRAM devices include NVRAM cards, battery-backed DRAM, and NVDIMM. In some embodiments the storage devices 165 may be accessible by multiple nodes 120, or multiple storage systems 100 as shared storage devices.

The storage system 100 provides logical device access to one or more user applications 110. In some embodiments the user application 110 and the storage system 100 may be running on the same physical systems. In other embodiments the user application 110 may access the storage system 100 through a storage network such as Ethernet, FibreChannel, InfiniBand, and PCIe networks.

The processors 130 provide an interface between the user applications 110 and the storage devices 165. For example, the processors 130. may provide a set of commands for the application 110 to read from and write to the storage devices 165 in the storage pool 160. The processors 130 run storage software applications to provide storage virtualization, capacity reduction, scale out, availability, mobility, and performance that often can't be achieved by the storage devices themselves. In the present disclosure, the processors 130 at different nodes 120 cooperate to manage the storage pool 160 and associated metadata 140 in a distributed fashion. Both the data blocks and the metadata 140 are stored redundantly across storage devices 165 at multiple nodes 120 and are accessible to each of the nodes 120. The metadata 140 can also be cached in a local cache 150, which may be stored in the memory 135 of the nodes 120.

Figure 2:
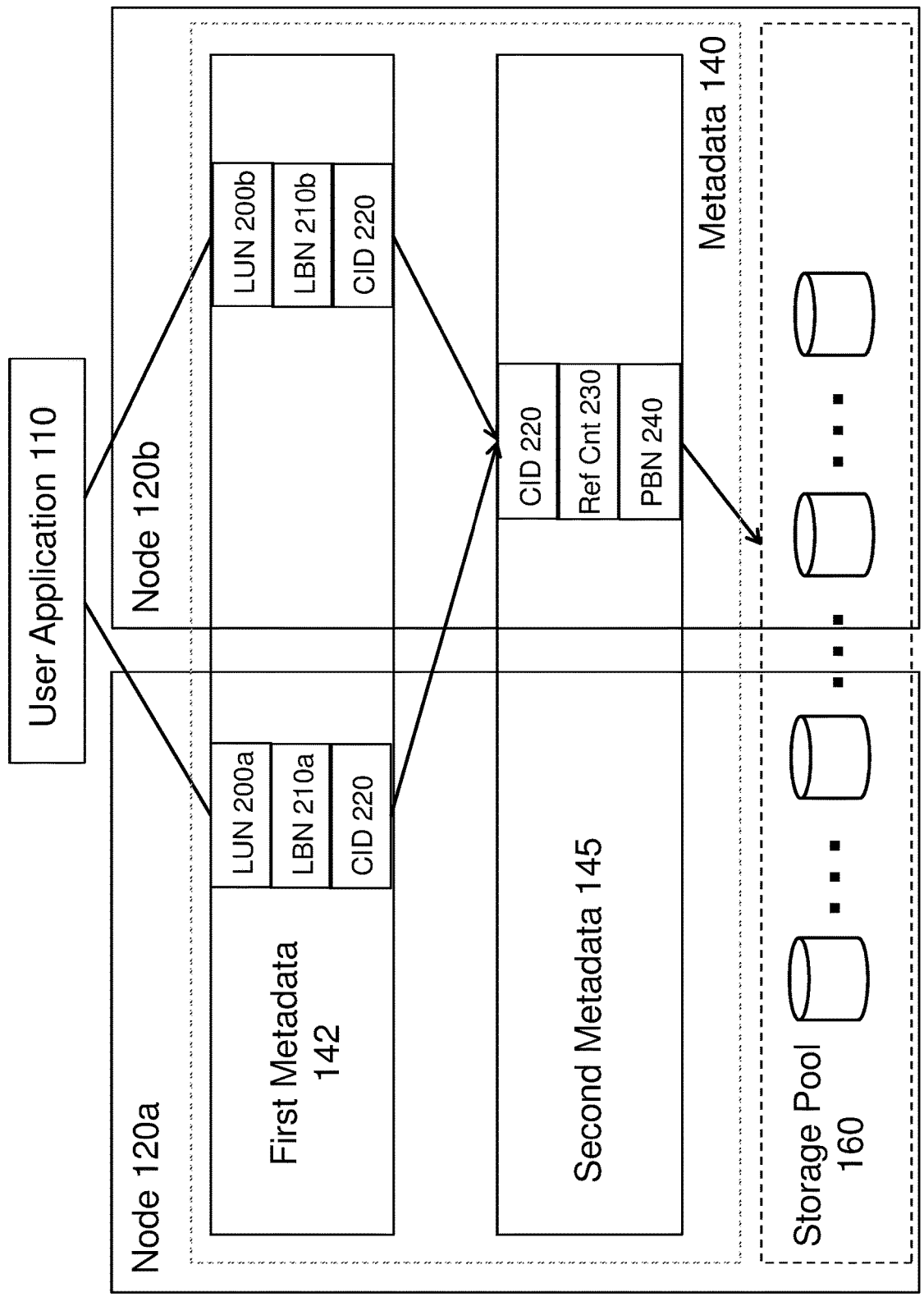
FIG. 2 illustrates a block diagram of the first and second metadata.

The present disclosure provides methods for managing the metadata 140 and storage pool 160 as illustrated in FIG. 2. The metadata 140 comprises first metadata 142 and second metadata 145. The first metadata 142 maps an exemplary logical data block's LUN 200a and LBN 210a to its unique content identifier (CID) 220. The content ID is unique to the data block's content—the likelihood that two distinct blocks will have the same content ID is vanishingly small. In some embodiments a strong hash function, such as SHA1 developed by the US National Institute for Standards and Technology (NIST), is used to compute a block's content ID and make it computationally infeasible that two distinct blocks will have the same content ID. The second metadata 145 maps every unique CID 220 to its PBN 240 within the storage pool 160. In the case where two logical data blocks have duplicate contents, both are mapped to the same CID 220/PBN 240. Data deduplication is therefore supported globally across LUNs 200 and nodes 120 without separate deduplication metadata. A Reference Count 230 is maintained to reflect the number of LUN/LBN references to CID 220. At a fixed block size, the size of the first metadata 142 is proportional to the usable capacity of the storage system whereas the size of the second metadata 145 is proportional to the system's physical capacity. In general, the usable capacity of the system is many times larger than its physical capacity due to data deduplication, compression, and snapshots, rendering the first metadata 142 many times bigger than the second metadata 145.

Figure 3:
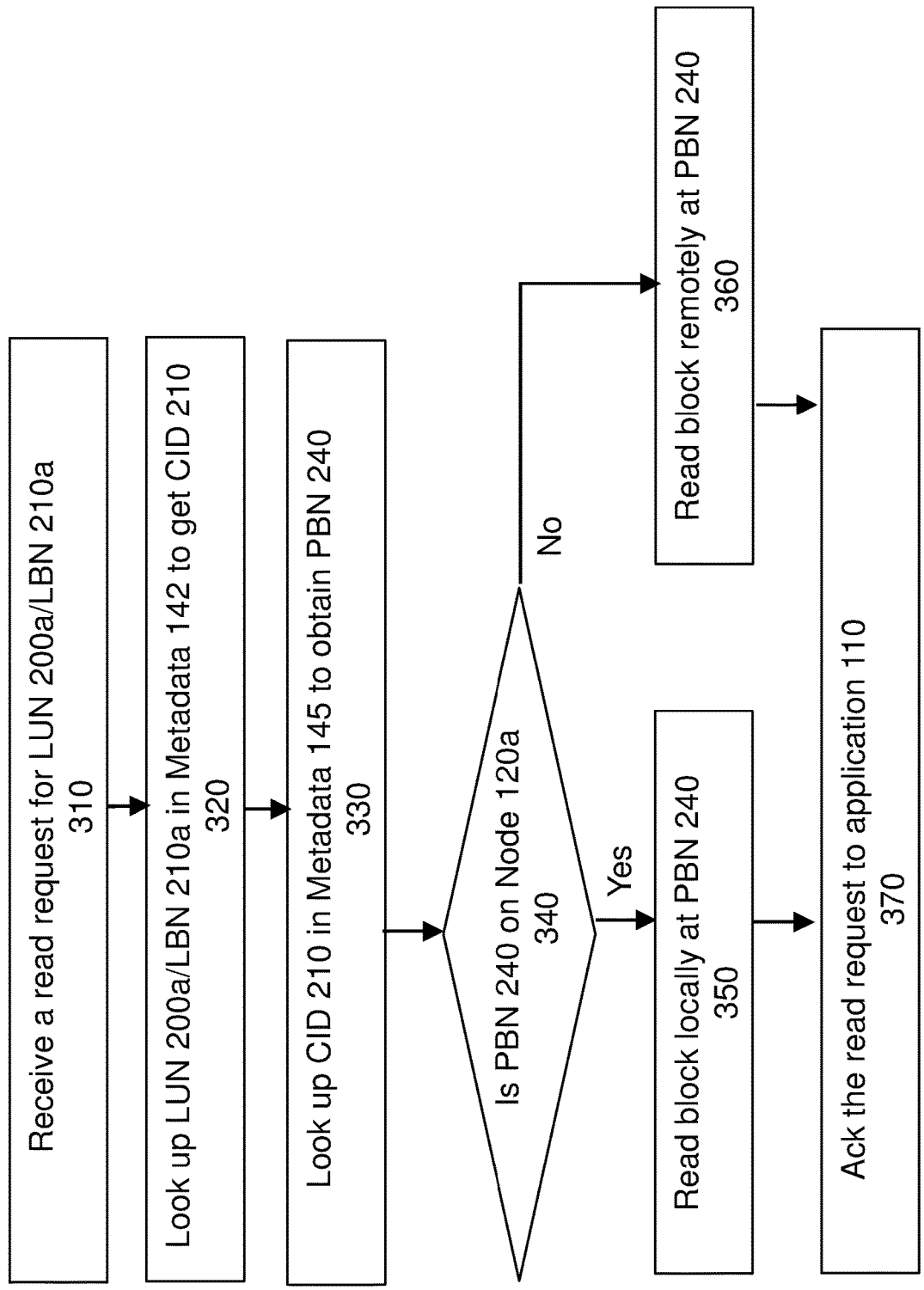
FIG. 3 illustrates a flow diagram of servicing a read request.

FIG. 3 illustrates a flow diagram for servicing a read request from the application 110: For purposes of this example, it is assumed that the read request is received by node 120a, with the understanding that the other nodes would operate similarly.

Step 310: The processor 130a on an exemplary node 120a receives a read request for LUN 200a/LBN 210a;

Step 320: The processor 130a looks up LUN 200a/LBN 210a in the first metadata 142 to obtain CID 220;

Step 330: The processor 130a looks up CID 220 in the second metadata 145 to obtain PBN 240;

Step 340: The processor 130a determines whether the CID 220/PBN 240 is on local Node 120a;

Step 350: If the CID 220/PBN 240 is on local Node 120a, the processor 130a reads the physical data block locally PBN 240 (Step 350);

Step 360: If the CID 220/PBN 240 is not on local Node 120a, the processor 130a reads the physical data block remotely at PBN 240;

Step 350: The processor 130a acknowledges the read request to the application 110.

In some embodiments, the storage processor 130a is configured to compute the content ID of the physical block at PBN 230 and compare that to the CID 210. If the two content IDs do not match, the processor 130a can attempt to read from a redundant copy to correct the data corruption.

Figure 4:
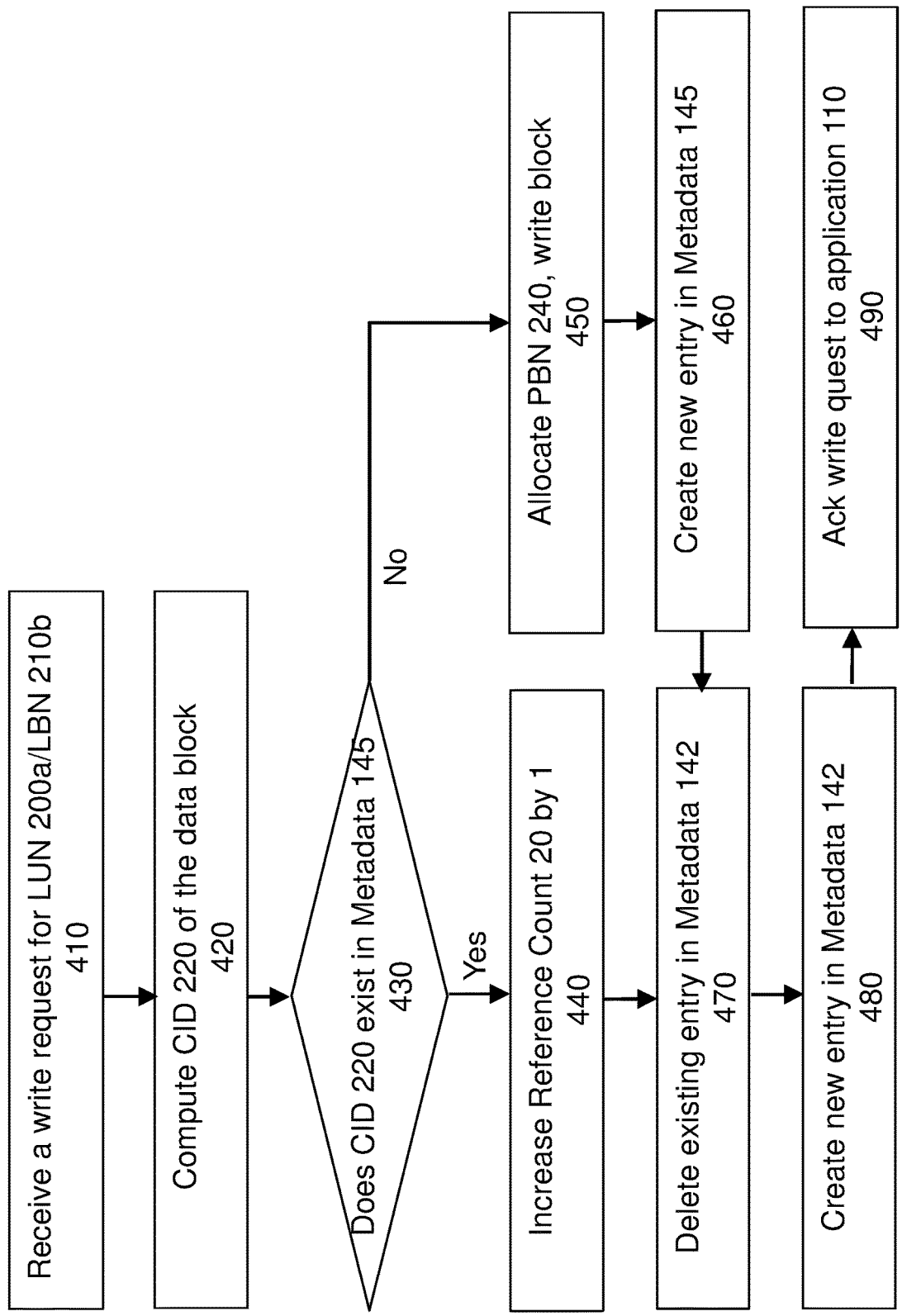
FIG. 4 illustrates a flow diagram of servicing a write request.

FIG. 4 illustrates a flow diagram for servicing a write request from the application 110: For purposes of this example, it is assumed that the read request is received by Node 120a, with the understanding that the other nodes would operate similarly.

Step 410: The processor 130a on an exemplary node 120a receives a write request for LUN 200a/LBN 210a;

Step 420: The processor 130a computes CID 220 of the data block in the write request;

Step 430: The processor 130a looks up CID 220 in the second metadata 145;

Step 440: If CID 220 already exists in the second metadata table 145, the processor 130a increases its corresponding Reference Count 230 by 1;

Step 450: If CID 220 does not exist in the second metadata 145, the processor 130a allocates PBN 240 locally or asks another processor 130b to allocate PBN 240 remotely from the free block list for the storage pool 160; the processor 130a writes the data block at PBN 240;

Step 460: The processor 130a creates a new entry for CID 220/PBN 240 in the second metadata 145 and sets its Reference Count to 1;

Step 470: The processor 130a looks up any existing entry for LUN 200a/LBN 210a in the first metadata table 142; decreases reference count for the CID/PBN by 1; If the reference count is zero returns the PBN to free block list for the storage pool 160;

Step 480: The processor 130a creates a new entry for LUN 200a/LBN 210a/CID 220 in the first metadata 142;

Step 490: The processor 130a acknowledges the completion of the write request to the application 110.

In some embodiments, the storage processor 130a writes the data block to a local NVRAM device at step 450 and acknowledges write completion to the application 110 before writing the data block to PBN 240 at a later time (deferred write).

As part of servicing a read or write request, access to the first metadata 142 based on the logical address, e.g., LUN 200/LBN 210, benefits from user application locality of reference. In some embodiments the first metadata is stored persistently within the storage pool 160 and cached in the memory 135 at each node 120 based on access frequency and recency. Access to the second metadata 145 based on CID 220 does not benefit from locality of reference and therefore cannot be cached effectively. In general, the second metadata 145 is many times smaller than the first metadata 142 due to deduplication, compression, and snapshot. In some embodiments, the second metadata 145 may be stored persistently within the storage pool 160 and cached entirely in the memory 135 at each node 120.

Figure 5A:
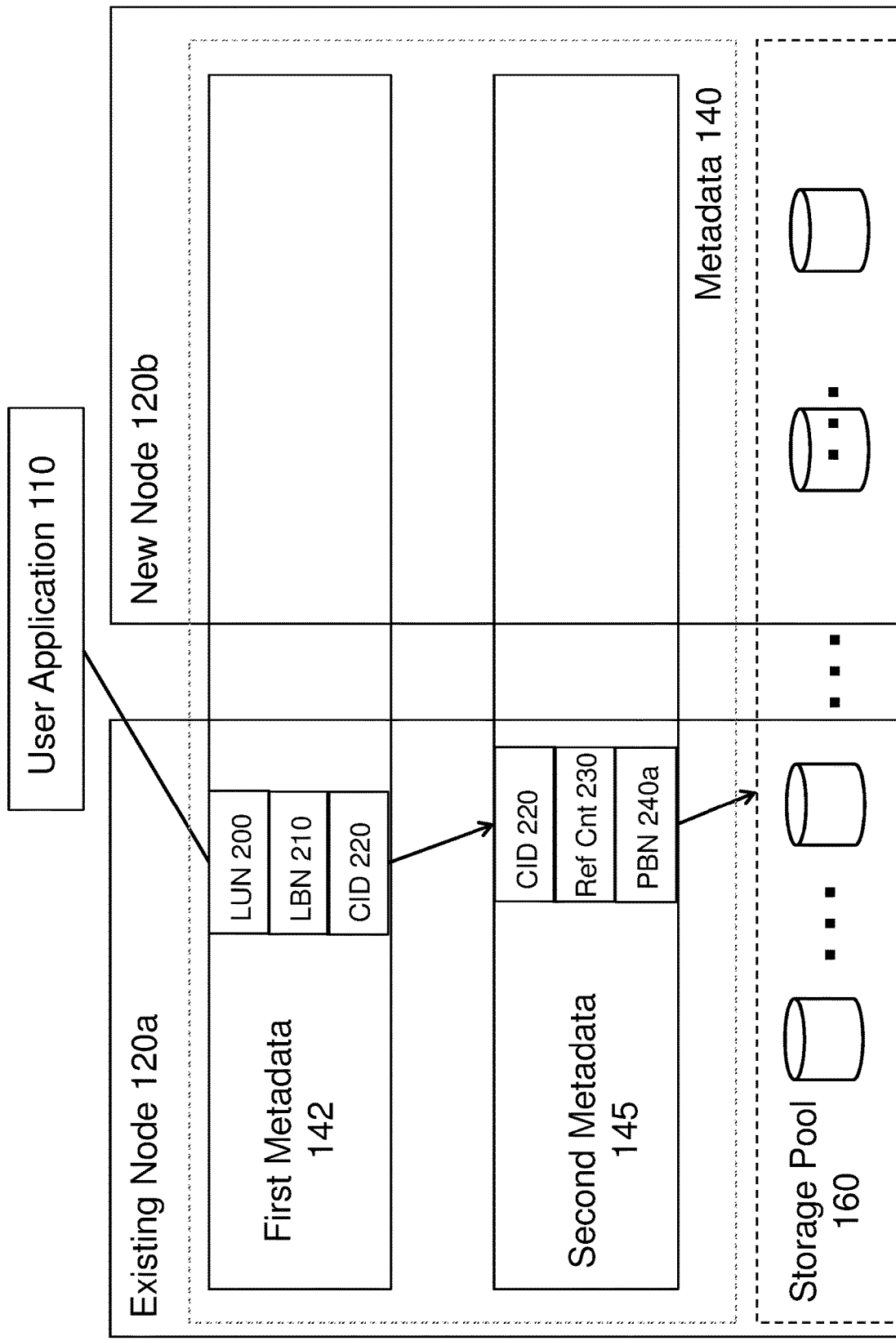
FIGS. 5A and 5B illustrate block diagrams of an add-a-node operation.
Figure 5B:
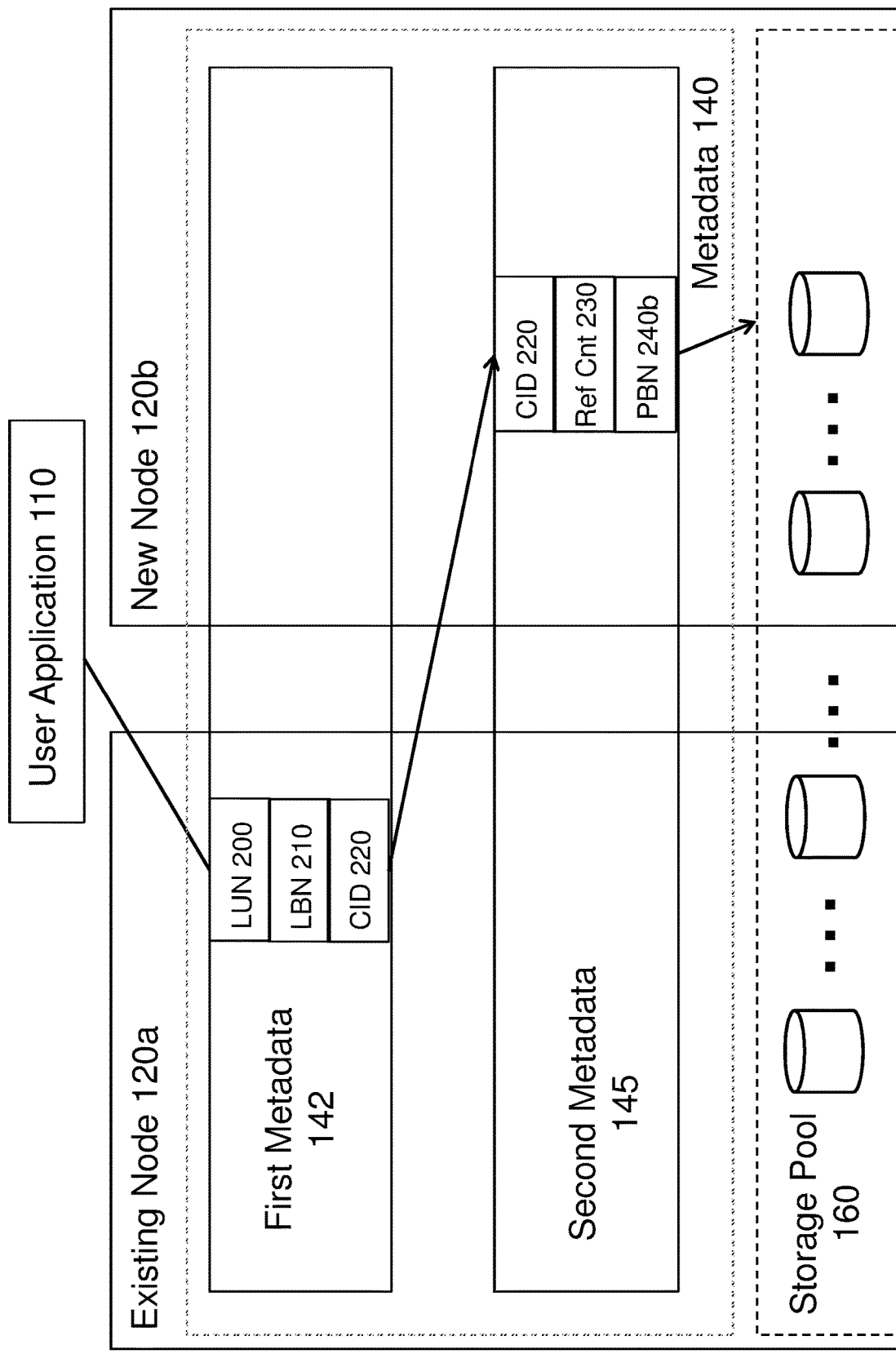

FIGS. 5A and 5B illustrate block diagrams for an add-a-node operation in support of scale out. When a new node 120b is added to the storage system 100 to provide more storage capacity and performance, a large number of data blocks need to be moved from their current physical locations to the new node 120b in order to redistribute data blocks across all available capacity and bandwidth. Add-a-node is expected to be transparent to user applications so that a change in a data block's physical location from a first PBN 240a at node 120a to a second PBN 240b at node 120b should not affect its LUN 200/LBN 210 addressed by the user application 110.

Figure 6:
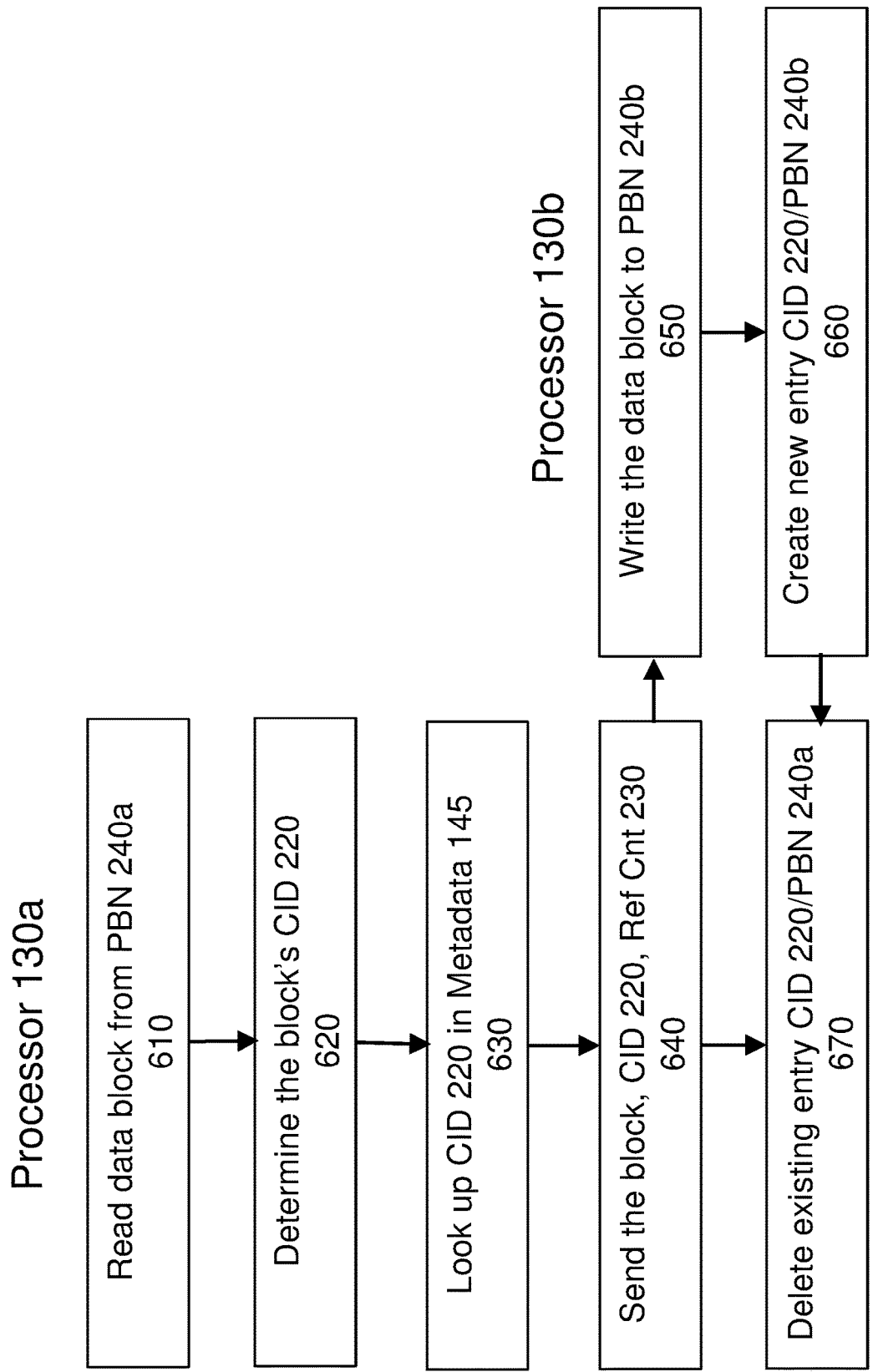
FIG. 6 illustrates a flow diagram of a add-a-node operation.

FIG. 6 illustrates a flow diagram for this add-a-node operation. For purposes of this example, it is assumed that node 120a is an existing node and node 120b is a newly added node. The processor 130a on node 120a determines which local data blocks should be moved to the new node 120b. The process for moving an exemplary physical data block PBN 240a in a storage device 165a at node 120a comprises:

Step 610: The processor 130a reads the data block at PBN 240a;

Step 620: The processor 130a determines the data block's CID 220 by either computing it or retrieving it from PBN 240a;

Step 630: The processor 130a looks up CID 220 in the second metadata 145;

Step 640: The processor 130a sends the data block, CID 220, and Reference Count 230 to the processor 130b on the new node 120b;

Step 650: The processor 130b allocates PBN 240b from its free block list and writes the data block to PBN 240b;

Step 660: The processor 130b creates new entry CID 220/Reference Count 230/PBN 240b in the second metadata 145 and acknowledges completion of these tasks to the processor 130a;

Step 670: The processor 130a removes CID 220/PBN 240a from the second metadata 145 and frees PBN 240a.

In some embodiments, the above steps for a single data block are batched to improve performance.

It should be evident from the above description that the add-a-node operation does not access or alter the first metadata 142 and therefore is transparent to the user application 110. Only the second metadata 145 is accessed and updated as part of the operation. In some embodiments, the second metadata 145 is many times smaller than the first metadata table 142 and is cached entirely in the memory 135 at each node 120 for low latency access.

Figure 7A:
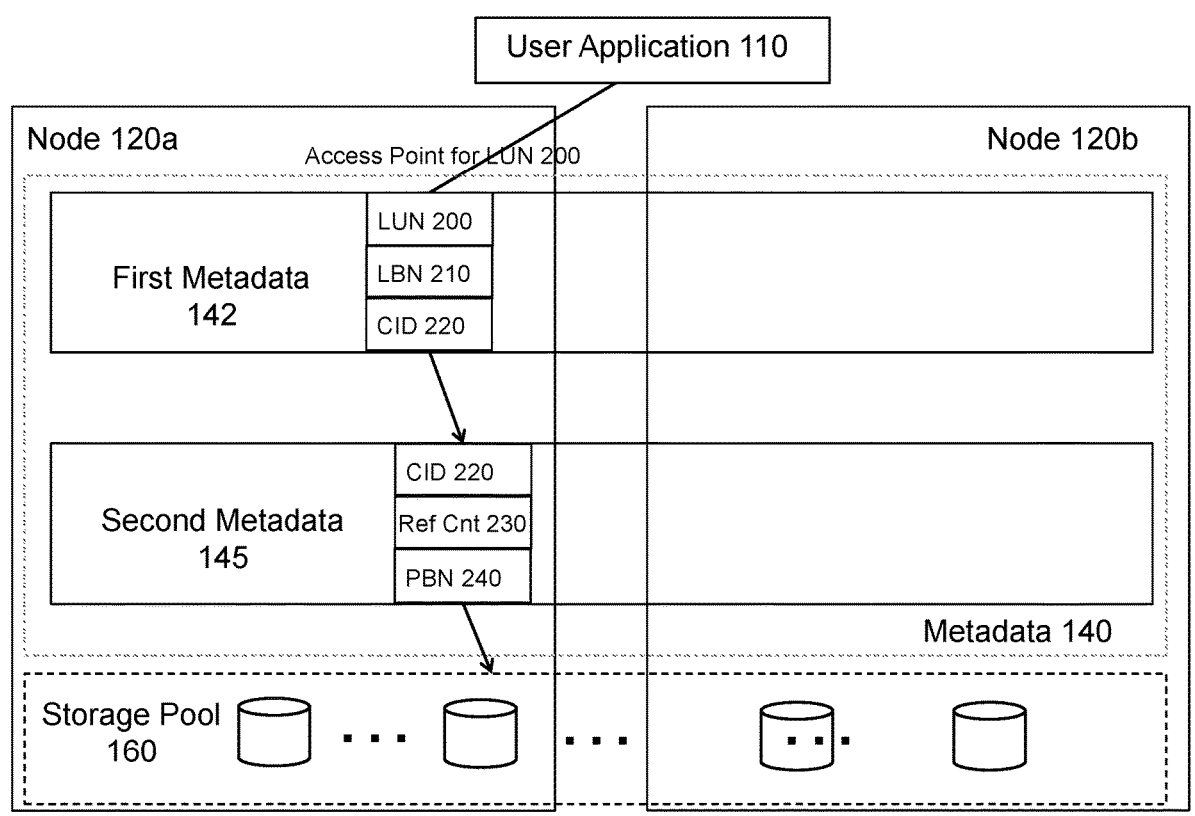
FIGS. 7A and 7B illustrate block diagrams of LUN mobility.
Figure 7B:
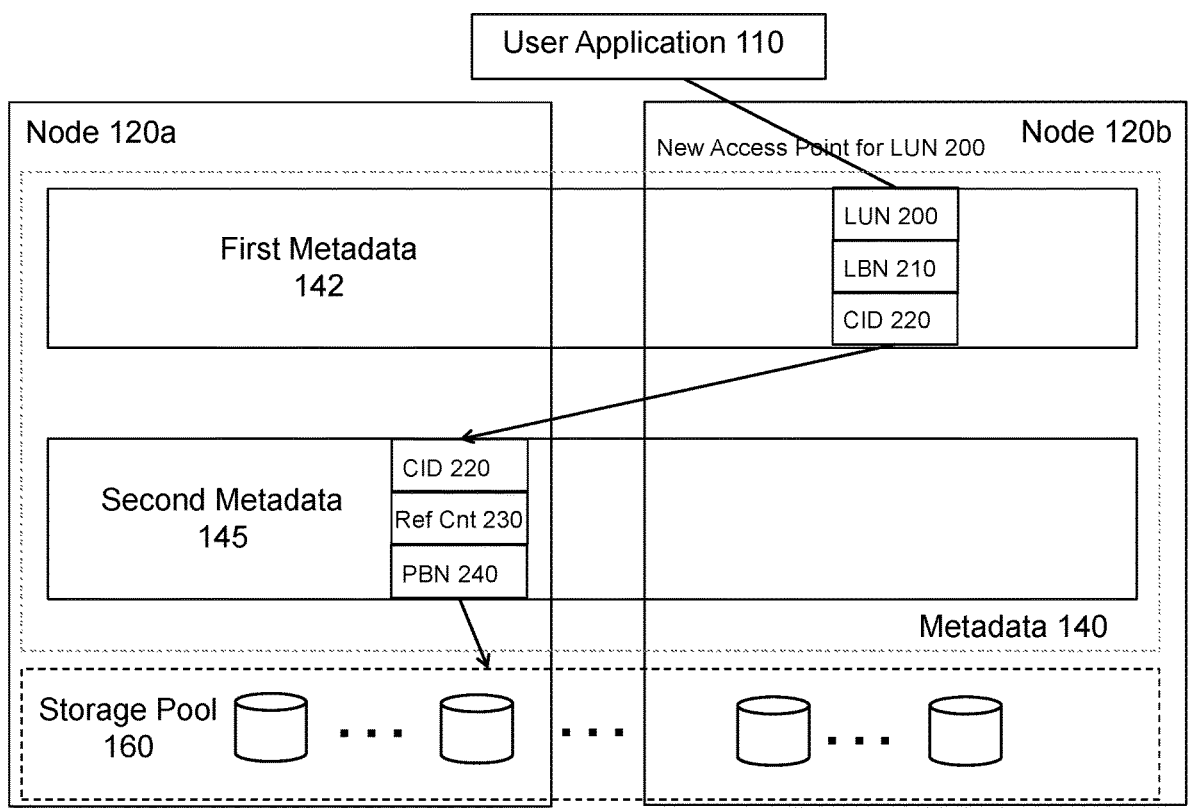

FIGS. 7A and 7B illustrate logical device mobility. An exemplary logical device identified by LUN 200 is presented to the user application 110 on node 120a. The logical device is then moved from node 120a to node 120b. Given that the metadata 140 is stored redundantly across the nodes and is accessible to all nodes 120, the processor 130a simply de-activates or disables access to the logical device identified by LUN 200 and the processor 130b activates or enables access to the logical device identified by LUN 200 by retrieving its first metadata 142 from the storage pool 160 into its memory 135b. This operation also applies to logical device availability where the node 120a fails and access to a logical device is lost.

Figure 8:
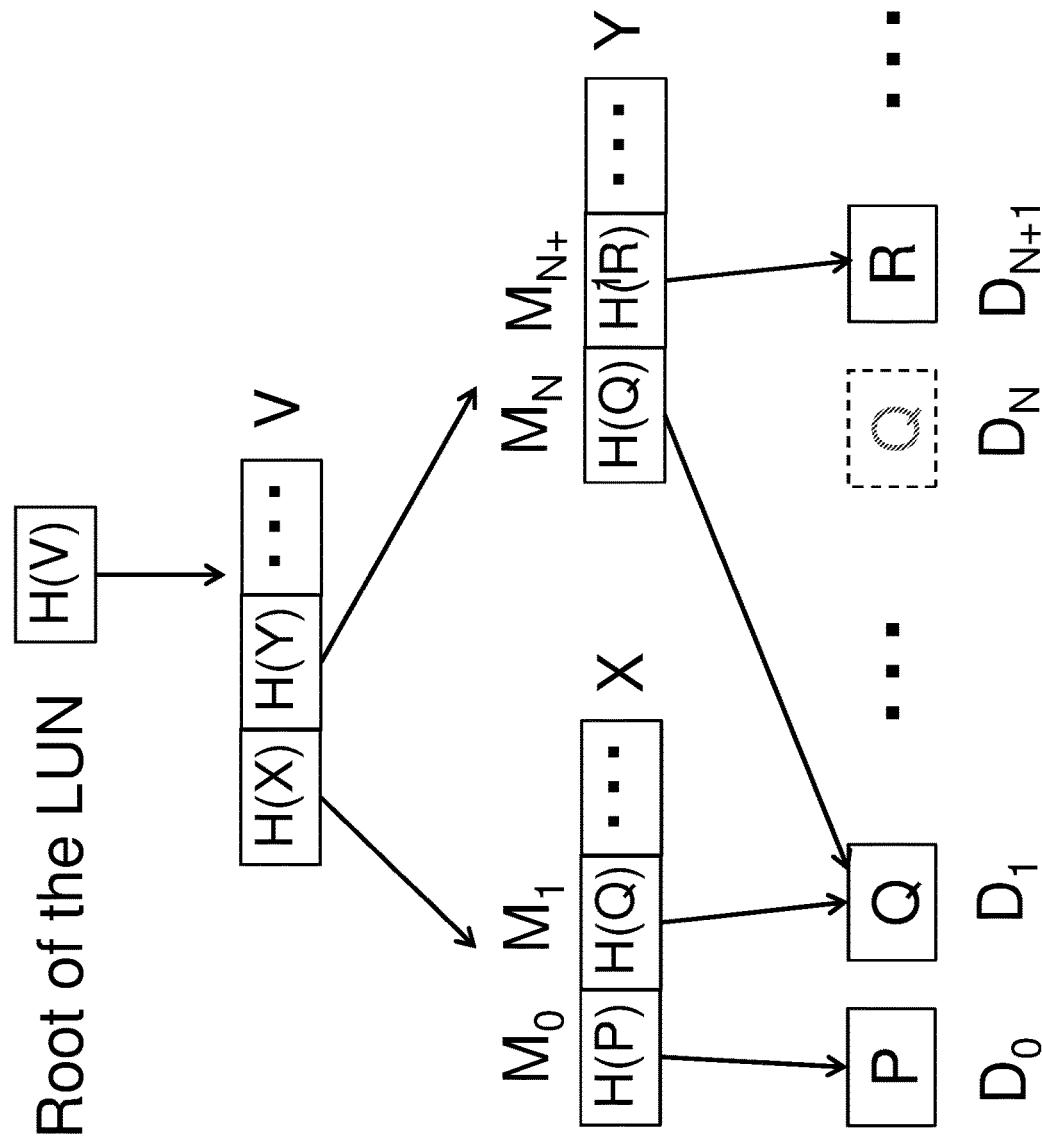
FIG. 8 illustrates a block diagram of the first metadata in a tree data structure.

The size of the first metadata 142 is proportional to the usable capacity of the storage system and can become very large due to deduplication, compression, and snapshots. Even with locality of reference, caching the first metadata 142 can be a challenge. The present disclosure provides methods to further reduce the time to access for logical device mobility/availability and reduce the size of the first metadata table 142 to make caching more effective. In some embodiments, a logical device's first metadata is implemented in a tree data structure as illustrated in FIG. 8. At the bottom of the tree is a linear sequence of data blocks $D_0$, $D_1, \ldots, D_N, D_{N+1}, \ldots$, corresponding to LBN 0, 1, ..., N, N+1, .... Each data block's content (P, Q, R) is hashed and its content ID (H(P), H(Q), H(R)) stored in a metadata block. Each metadata block's content (X, Y) is also hashed and its content ID (H(X), H(Y)) is stored in a metadata block. This process can be repeated recursively until a single content ID H(V) is obtained, which represents the root of the logical device. In the case where data block $D_1$ and $D_N$ have the same content Q, both metadata $M_1$ and $M_N$ have the same content ID H(Q), resulting in data deduplication. LBN N for example is not stored in the metadata entry $M_N$ but can be easily determined based on $M_N$'s relative position in the tree. This structure not only greatly reduces the size of the first metadata table 142 but also makes it feasible to deduplicate metadata blocks.

Figure 9:
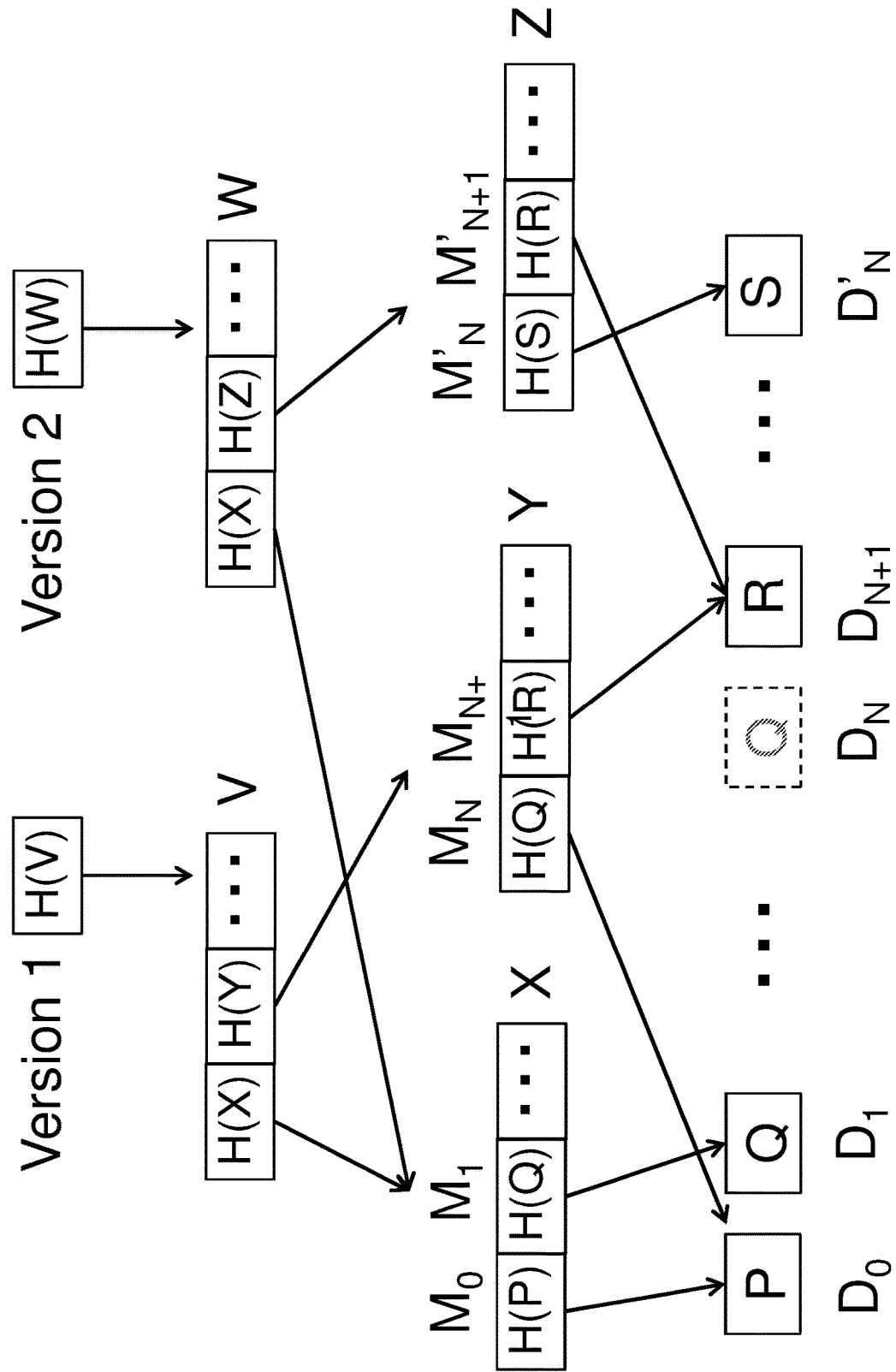
FIG. 9 illustrates a block diagram of metadata deduplication.

FIG. 9 illustrates that metadata blocks are deduplicated between two versions of the tree. The only difference from Version 1 to Version 2 is that the block content at LBN N is changed from Q to S. This change results in a new metadata entry $M'_N$, new metadata block Z, and new metadata block W, but the metadata block X is unchanged and shared between Version 1 and Version 2. With this tree structure in place for a logical device, the processor 120b can activate or enable access to the logical device by simply retrieving the root of its tree, resulting in a much shorter time to access. The rest of the tree for the logical device may be retrieved and cached as their LBNs are accessed by the user application 110.

Figure 10A:
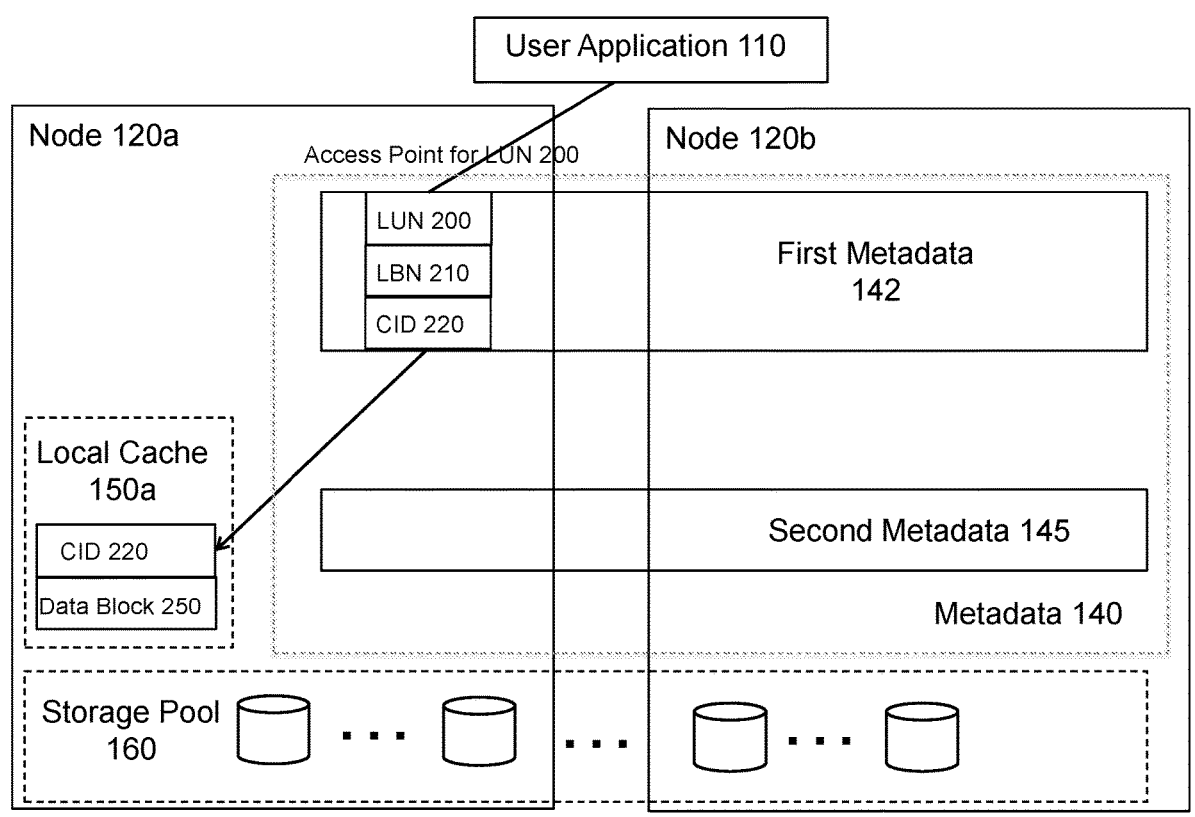
FIGS. 10A and 10B illustrate block diagrams of local caching.
Figure 10B:
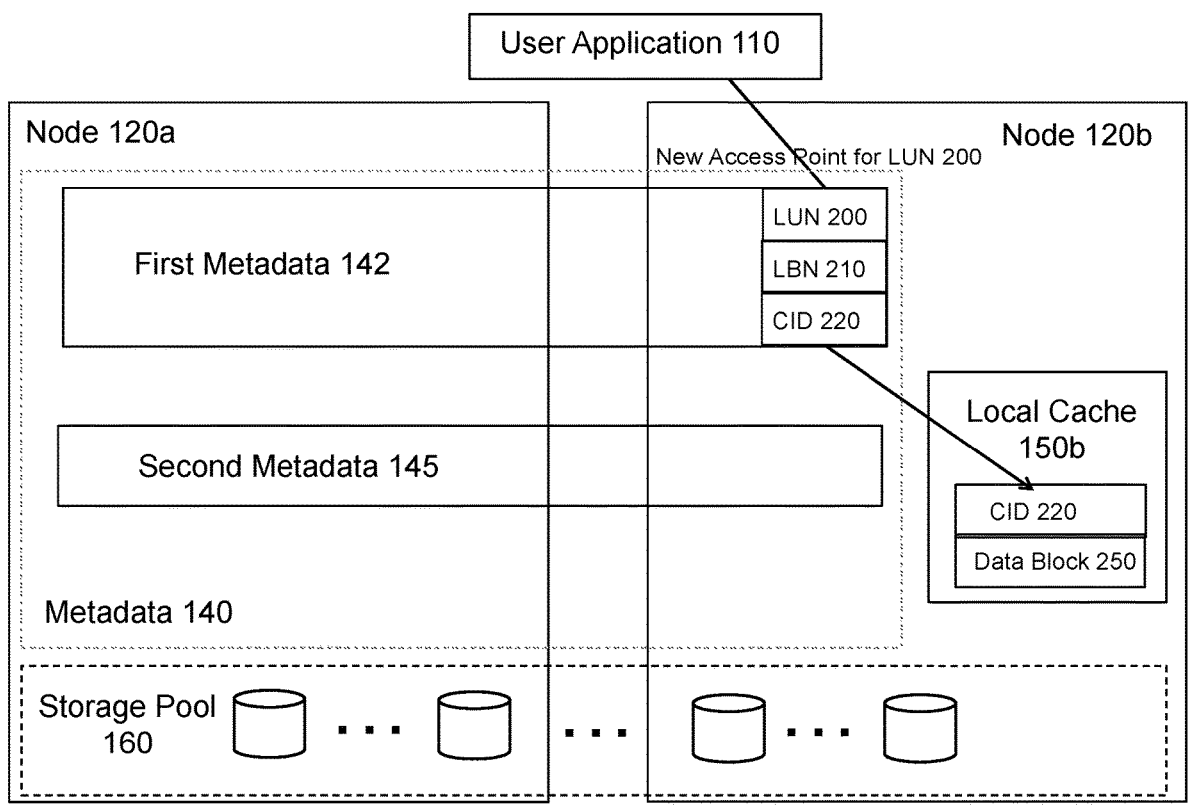

The present disclosure also provides methods for local caching. Local caching reduces network access latency and improves performance without data locality, which causes longer time to performance for logical device mobility. FIG. 10A illustrates local caching for an exemplary logical device identified by LUN 200. As LUN 200/LBN 210/CID 220 is first accessed, its data block 250 is retrieved from the storage pool 160, possibly from a remote node. Based on access frequency and recency, the processor 130a may decide to cache the data block 250 and its CID 220 in a local cache 150a. The next access to LUN 200/LBN 210/CID 220 results in reading the data block 250 from the local cache 150a without network access latency. FIG. 10B illustrates a method to shorten time to performance for logical device mobility. When a logical device is moved from node 120a to node 120b, the processor 120a pushes its cached data blocks for the logical device from its local cache 150a to node 120b's local cache 150b. As a result access performance to the logical device on node 120b is greatly improved with the cached blocks for LUN 200 in the local cache 150b on node 120b.

What is claimed is:

1. A method implemented in a data storage system of moving data and logical devices, said method comprising:
    storing data blocks in a data storage pool comprising a plurality of data storage devices distributed among two or more data storage nodes, each data block associated with a unique content identifier;
    storing metadata mapping the logical addresses of logical data blocks associated with one or more logical devices to physical addresses of corresponding data blocks stored in said data storage pool, said metadata comprising:
        first metadata mapping the logical addresses associated with said logical devices to corresponding content identifiers; and
        second metadata mapping the content identifiers to corresponding ones of the physical addresses of the data blocks;
    moving an access point for a first logical device from a first one of said data storage nodes to a second one of said data storage node.

2. The method of claim 1 wherein moving the access point comprises: disabling access to said logical device on the first data storage node; and enabling access to said logical device on the second data storage node.

3. The method of claim 1 wherein moving the access point comprises: detecting a failure of the first data storage node; and enabling access to said logical device on the second data storage node responsive to detection of the failure.

4. The method of claim 1 further comprising organizing the first metadata associated with the first logical device in a tree data structure comprising a root and a plurality of entries associated with logical addresses on the first logical device.

5. The method of claim 4 wherein moving the access point comprises:

retrieving, by the second data storage node, the root of the tree data structure associated with the first logical device; and activating access to said logical device on the second data storage node.

6. The method of claim 5 wherein moving the access point further comprises retrieving the entries associated with the logical addresses of the first logical device when the logical addresses are accessed.

7. The method of claim 1 wherein moving the access point further comprises pushing the first data storage node's local cache for the first logical device to the second data storage node.

8. A data storage system comprising:

a plurality of data storage nodes connected by a network;

a data storage pool comprising a plurality of data storage devices distributed among the data storage nodes, and processing circuitry distributed among the data storage nodes, said processing circuitry configured to:

store data blocks in said data storage pool, each data block associated with a unique content identifier store, in said data storage pool, metadata mapping the logical addresses of logical data blocks associated with one or more logical devices to physical addresses of corresponding data blocks stored in said data storage device, said metadata comprising:

first metadata mapping the logical addresses of logical data blocks on said logical devices to corresponding content identifiers; and second metadata mapping the content identifiers to corresponding ones of the physical addresses of the data blocks; and move an access point for a first logical device from a first one of said data storage nodes to a second one of said data storage node.

9. The data storage system of claim 8 wherein, to move the access point, the processing circuitry is configured to:

disable access to said logical device on the first data storage node; and enable access to said logical device on the second data storage node.

10. The data storage system of claim 8 wherein, to move the access point, the processing circuitry is configured to:

detect a failure of the first data storage node; and enable access to said logical device on the second data storage node responsive to detection of the failure.

11. The data storage system of claim 8 wherein the processing circuitry is further configured to organize the first metadata associated with the first logical device in a tree data structure comprising a root and a plurality of entries associated with logical addresses on the first logical device.

12. The data storage system of claim 11 wherein, to move the access point, the processing circuitry comprises:

a processor in the second data storage node configured to retrieve the root of the tree data structure associated with the first logical device and enable access to said logical device on the second data storage node.

13. The data storage system of claim 12 wherein, to move the access point, the processing circuitry in the second data storage node is further configured to retrieve the entries associated with the logical addresses of the first logical device when the logical addresses are accessed.

14. The data storage system of claim 8 wherein, to move the access point, the processing circuitry in the first data storage node is further configured to push its local cache for the first logical device to the second data storage node.

\* \* \* \* \*